(12) United States Patent
Park

(10) Patent No.: US 9,756,159 B2
(45) Date of Patent: Sep. 5, 2017

(54) HANDPHONE

(71) Applicant: New York University, New York, NY (US)

(72) Inventor: Tae Hong Park, New York, NY (US)

(73) Assignee: NEW YORK UNIVERSITY, New York, NY (US)

( * ) Notice: Subject to any disclaimer, the term of this patent is extended or adjusted under 35 U.S.C. 154(b) by 0 days.

(21) Appl. No.: 14/767,559

(22) PCT Filed: Feb. 13, 2014

(86) PCT No.: PCT/US2014/016256
§ 371 (c)(1),
(2) Date: Aug. 12, 2015

(87) PCT Pub. No.: WO2014/127126
PCT Pub. Date: Aug. 21, 2014

(65) Prior Publication Data
US 2015/0381782 A1     Dec. 31, 2015

Related U.S. Application Data

(60) Provisional application No. 61/764,882, filed on Feb. 14, 2013, provisional application No. 61/833,775, (Continued)

(51) Int. Cl.
*H04B 3/00*     (2006.01)
*H04M 1/03*     (2006.01)
(Continued)

(52) U.S. Cl.
CPC ......... *H04M 1/035* (2013.01); *H04M 1/0281* (2013.01); *H04M 9/08* (2013.01);
(Continued)

(58) Field of Classification Search
None
See application file for complete search history.

(56) References Cited

U.S. PATENT DOCUMENTS

| 5,008,864 A | 4/1991 | Yoshitake |
| 5,412,734 A | 5/1995 | Thomasson |

(Continued)

FOREIGN PATENT DOCUMENTS

| JP | 2005-175764 | 6/2005 |
| JP | 2007-251901 | 9/2007 |

(Continued)

OTHER PUBLICATIONS

PH Technical Labs, HOT Watch: Complete Smart Watch w/Revolutionary Private Calls, http://www.kickstarter.com/projects/hotsmartwatch/hot-watch-complete-smart-watch-w-revolutionary-pri-0, Jul. 31, 2013, 25 pages.

(Continued)

*Primary Examiner* — Maria El-Zoobi
(74) *Attorney, Agent, or Firm* — Foley & Lardner LLP

(57) ABSTRACT

A handphone is configured to receive a first audio signal of a telecommunication conversation from a telecommunication device and send a second audio signal of the telecommunication conversation to the telecommunication device. A modulated ultrasound frequency audio signal that is directional is created from the first audio signal of the telecommunication conversation. The modulated ultrasound frequency audio signal is output via a loudspeaker. A direction of the modulated ultrasound frequency audio signal is controlled by a physical object and a location of the loudspeaker.

25 Claims, 17 Drawing Sheets

Related U.S. Application Data filed on Jun. 11, 2013, provisional application No. 61/901,997, filed on Nov. 8, 2013.

(51) Int. Cl.
    *H04R 1/34*     (2006.01)
    *H04R 1/40*     (2006.01)
    *H04M 9/08*     (2006.01)
    *H04M 1/02*     (2006.01)
    *H04R 19/02*     (2006.01)
    *H04R 23/00*     (2006.01)

(52) U.S. Cl.
    CPC .............. *H04R 1/345* (2013.01); *H04R 1/403* (2013.01); *H04R 19/02* (2013.01); *H04R 23/002* (2013.01); *H04R 2499/11* (2013.01)

(56) References Cited

U.S. PATENT DOCUMENTS

| | | | |
|---|---|---|---|
| 8,515,505 B1 | 8/2013 | Pattikonda | |
| 8,849,185 B2* | 9/2014 | Cheung | H04R 1/403 |
| | | | 381/150 |
| 8,855,729 B1 | 10/2014 | Pattikonda | |
| 2005/0207590 A1* | 9/2005 | Niehoff | G10K 15/02 |
| | | | 381/77 |
| 2006/0167687 A1* | 7/2006 | Kates | G09B 21/00 |
| | | | 704/235 |
| 2008/0037803 A1 | 2/2008 | Breed | |
| 2012/0082013 A1 | 4/2012 | Yeung et al. | |
| 2012/0250908 A1 | 10/2012 | Jiang et al. | |
| 2015/0110333 A1* | 4/2015 | Norris | H04R 19/02 |
| | | | 381/394 |

FOREIGN PATENT DOCUMENTS

| | | |
|---|---|---|
| JP | 2008-060648 | 3/2008 |
| WO | WO-2007/031083 | 3/2007 |

OTHER PUBLICATIONS

International Search Report and Written Opinion for Application No. PCT/US2014/016256, mailed Jun. 5, 2014, 8 pages.

Norris, Woody, Hypersonic sound and other inventions transcript; http://www.ted.com/talks/woody_norris_invents_amazing_things?language=en, Feb. 2004, 7 pages.

* cited by examiner

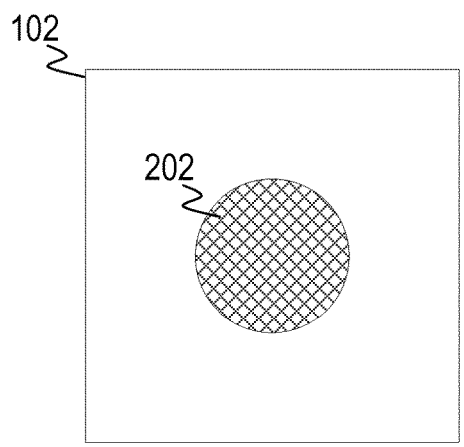
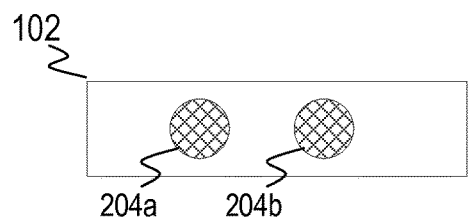
Fig. 3
Fig. 2

HANDPHONE

CROSS REFERENCE TO RELATED APPLICATIONS

The present application is a National Stage of International Application No. PCT/US2014/016256, filed Nov. 20, 2014, which claims priority to U.S. Provisional Application 61/764,882, filed Feb. 14, 2013 and U.S. Provisional Application 61/833,775, filed Jun. 11, 2013, and U.S. Provisional Application 61/901,997, filed Nov. 8, 2013, which are incorporated herein by reference in its entirety.

BACKGROUND

Mobile phones and other telecommunication devices are prevalent in society. Users can communicate using telecommunication devices in various ways, such as, placing the telecommunication device in close proximity to the user's ear; using a speakerphone capability; or using a wearable headset. Each of these ways to communicate has some disadvantage. For example, while not clearly understood, some studies have shown potential health risks to using a mobile phone in close proximity to the user's head. Wearing a headset can be inconvenient, uncomfortable, aesthetically unpleasing, and inefficient when receiving and making calls. For example, putting on an earpiece when receiving a call is inconvenient as it takes time and effort. Speakerphones use conventional loudspeaker systems. Accordingly, there can be privacy issues and acoustic feedback problems for the user of speakerphones.

The use of highly directional sound transmission technology can be best described when taking a light bulb and torch light/spot light as examples. In the case of light bulbs, the light will generally disperse equally in all directions. The spotlight will, on the other hand, project a more focused beam of light. A similar observation can be made when considering conventional loudspeaker systems used in homes vs. highly directional loudspeaker systems. The former has poor directionality and the latter high directionality. Furthermore, generally speaking, low frequency audio signals have poor directivity and can be heard from "anywhere" which explains positioning strategies of subwoofers in any given room/space—the sound will travel in all directions and it will not matter greatly where one places the subwoofer. High frequencies audio signals, however, are more directional and thus have to be placed strategically so as to ensure that the sound reaches the listener as directly as possible. For example, turning the loudspeaker with tweeters and mid-range loudspeaker cones away from the acoustic sweet spot of hearing will result in poor sound for a listener. However, due to conventional loudspeaker system technologies, sound will still be heard with relative clarity.

Creating a sound projection system that is highly directional is generally achieved through two means. One is acoustic beamforming and the other is through ultrasound modulation. Acoustic beamforming has the advantage of employing conventional loudspeakers which directly generate sounds in the audible range. Acoustic beamforming typically works by employing an array of loudspeakers that are amplified separately with individual sound modification and signal processing blocks that filter the signal using specific filter coefficients. The net result of the individual filters and individual amplifiers affect the resulting constructive and deconstructive interferences contributed by each audio signal. The phase delays and shaping of the frequency responses of each audio channel results in fine directional control, which creates highly directional sound beams. In the case of the ultrasound system, the sound modification part is very different. As shown in FIG. 3, the desired sound (e.g., music) acts as a modulator for a high frequency (ultrasound) carrier frequency. The carrier frequency is typically at 40 kHz or above, which is above the hearing range of humans and thus cannot be heard directly. However, the resulting modulated ultrasound interacts with air in a non-linear way, which in turn produces an audible signal. The audible artifacts result when sound waves interact in non-linear mediums such as fluids and air, a phenomenon known as "nonlinear interaction of sound waves" or the "scattering of sound by sound" governed by equations as described in 1 P. J. Westervelt, "Parametric Acoustic Array," J. Acoust. SOc. Am. 35, 535-537 0963 and also 1 Yoneyama, Masahide; Jun Ichiroh, Fujimoto (1983). "The audio spotlight: An application of nonlinear interaction of sound waves to a new type of loudspeaker design". Journal of the Acoustical Society of America 73 (5): 1532-1536. The result is a highly directive sound beam that can be used to direct sound to very specific spots—a person in a crowd, for example, where others next to this person will hear nothing. The audible sounds are created by a concept referred to as difference frequencies in conjunction with non-linear interaction with the air functioning as the loudspeaker itself for the audible sound, which are typically finely tuned to the carrier's center frequency. Prior difference frequency utilizing systems were impractical in creating high bandwidth audible acoustic signals.

SUMMARY

One aspect relates to a system comprising an audio device having a main enclosure with a display and including a first transducer. An ultrasonic loudspeaker is positioned in communication with the band. The waveguide extends from the main enclosure to the ultrasonic loudspeaker and places the first transducer in communication with the ultrasonic loudspeaker.

Another aspect relates to a wearable communication device comprising a receiver for receiving audio information. A pre-processing module is connected with the receiver for modifying the received audio information. A modulation module is connected with the pre-processing module for modulating the pre-processed audio information. An amplification module connected with the modulation module for amplifying the modulated audio information. An ultrasonic loudspeaker is connected with the amplification module to receive and to emit the amplified audio information.

In another aspect, a method comprises receiving, via a directional ultrasound audio device, a first audio signal; creating a directional modulated ultrasound frequency audio signal from the first audio signal; and controlling output of the modulated ultrasound frequency audio signal via a loudspeaker, wherein a direction of the modulated ultrasound frequency audio signal is controlled by a physical object and a location of the loudspeaker.

The foregoing summary is illustrative only and is not intended to be in any way limiting. In addition to the illustrative aspects, implementations, and features described above, further aspects, implementations, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

FIG. 2 illustrates a top-view of a handphone in accordance with an illustrative implementation.

FIG. 3 illustrates a side-view of a handphone in accordance with an illustrative implementation.

Figure 1:
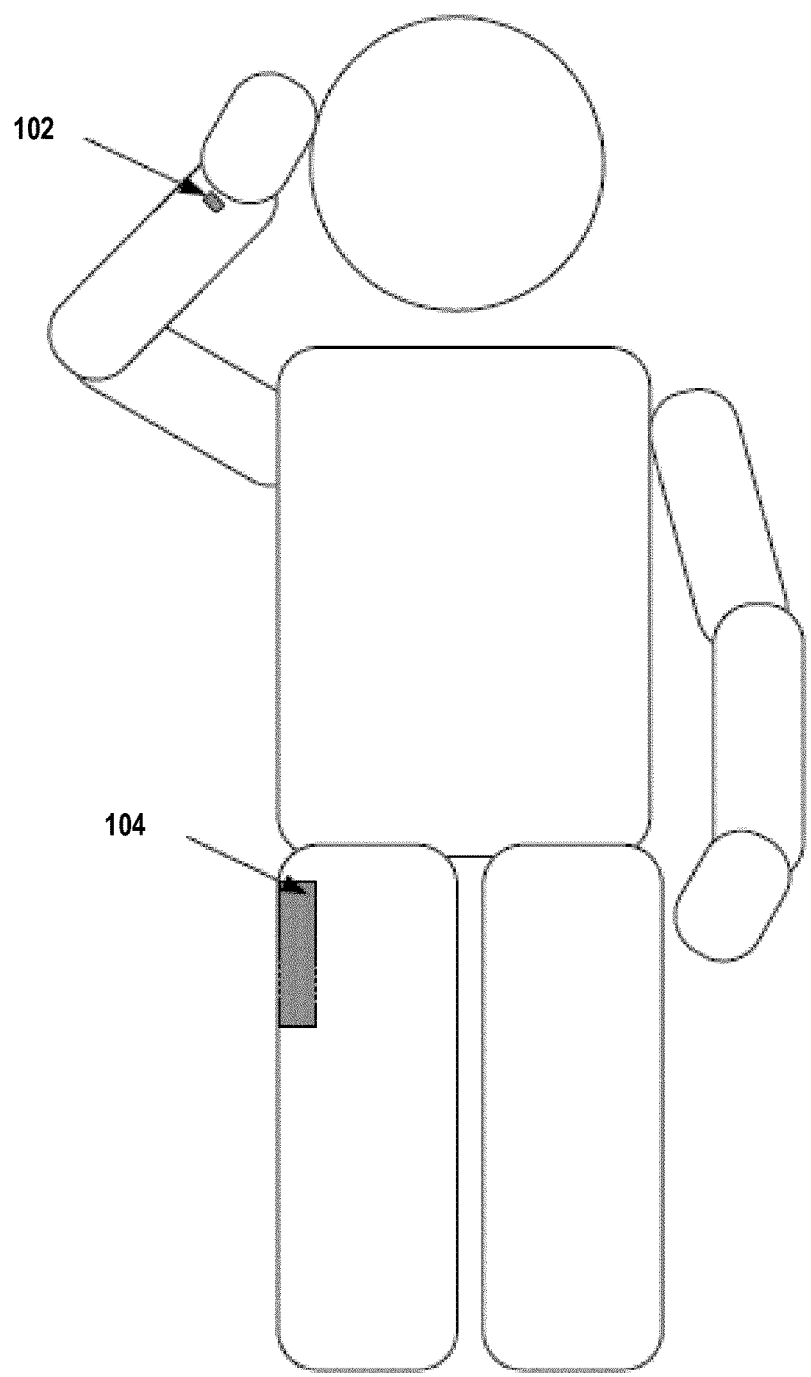
FIG. 1 illustrates a handphone system in accordance with an illustrative implementation.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

This specification describes a handphone that allows for telecommunication of voice and/or generic audio signals using a physical object, such as a user's hand. The handphone removes the need for physically holding a telecommunication device and/or using accessories, such as a headphone, earpiece, or a speakerphone. A telecommunication device can be any computing device capable of telecommunication. Examples include, but are not limited to, a mobile phone, a smartphone, a tablet, etc.

FIG. 1 illustrates a system 100 in accordance with an illustrative implementation. The illustrated system 100 includes a device 102. In one implementation shown in FIG. 1, the system 100 includes a telecommunication device 104 and the device 102 is a handphone device. The telecommunication device 104 can be kept in the user's pocket when in use. In another implementation, the telecommunication device 104 is located within a proximity of the user but not directly located on the user. For example, known wireless communication technology, such as Bluetooth®, can be used to communicate data between the telecommunication device 104 and the handphone device 102. Further, the telecommunication device 104 and the handphone device 102 are a single device in one implementation.

Utilizing Bluetooth® provides the advantage of not only transmitting and receiving audio data but other data types such as caller ID, text messages, and email related information that can be shared between the handphone and the device that it is communicating with.

In these implementations, the telecommunication device 104 can be located anywhere in the proximity of the user, such that the wireless communication technology can be used for data communication between the telecommunication device 104 and the handphone device 102. In another implementation, the handphone device 102 can be connected to the telecommunication device 104 using a wired connection. In other implementations, a telecommunication device is not used. Rather, any audio device, such as an mp3 player, audio record, etc., can be used to provide audio data to the handphone device 102. The handphone device 102 can then deliver the audio data to the user of the audio device.

Figure 5:
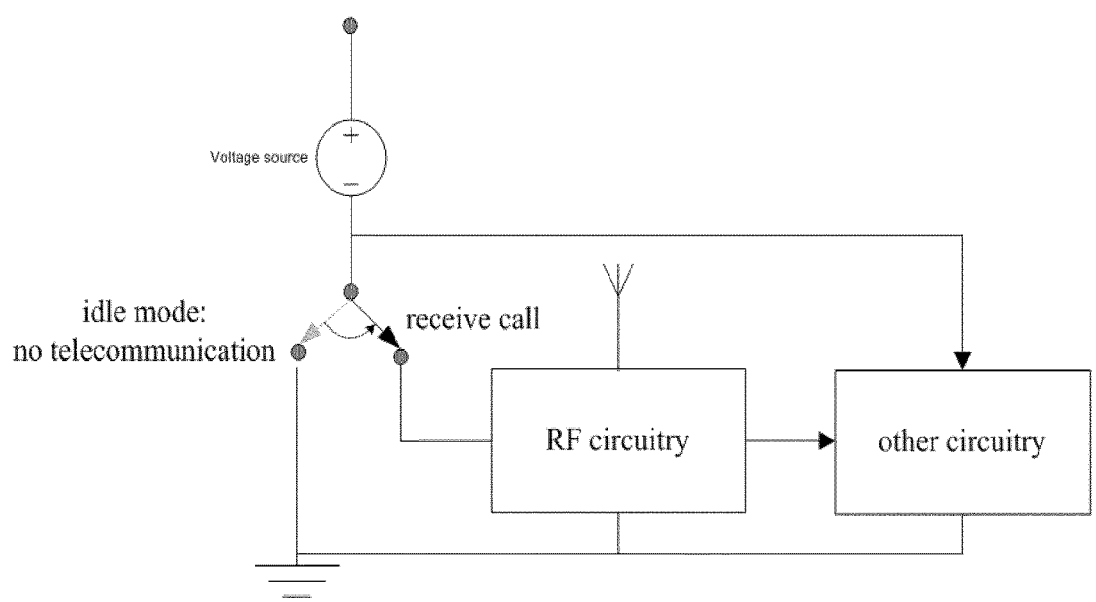
FIG. 5 illustrates efficient transmission of analog ultrasound.

Other wireless communication systems such as, but not limited to, frequency modulation (FM) can be used alone, or in conjunction with Bluetooth® and other radio frequency (RF) technologies in the context of handphone to telecommunication device communication setup to address power efficiency on the handphone side. This may be accomplished by doing the some of the analog and digital signal processing and other computation tasks on the transmitter device (e.g., smartphone) whereby the modulated ultrasound signal can be directly transmitted to the handphone. When using both FM and Bluetooth®, for example, Bluetooth® can be used for any communication between the handphone and telecommunication device (e.g. caller ID, text messages, and email related information) including notification of incoming calls to the communication device. When an incoming call is detected on the telecommunication device, and a call receive (or transmission) initiated by the user, the FM-RF circuitry is enabled and powered on both the telecommunication device and the handphone device as shown in FIG. 5.

Figure 6A:
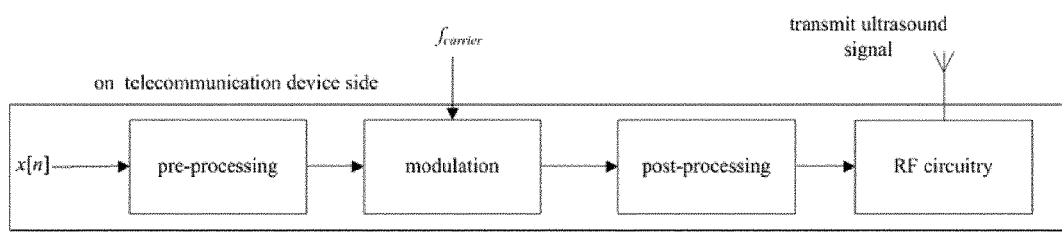
FIG. 6A illustrates analog ultrasound signal transmission by a telecommunications device.

The RF circuitry, such a FM transmitter circuitry, can be used to directly transmit the modulated analog ultrasound signal to the handphone as shown in FIG. 6A. In this setup, some of the analog and digital processing is rendered on the telecommunication device, an alternative strategy to address power consumption on the handphone.

Figure 6B:
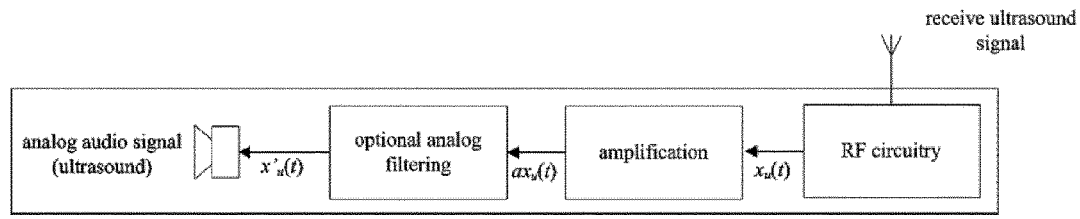
FIG. 6B illustrates analog ultrasound signal receipt by a handphone device.

The handphone in turn can amplify the transmitted modulated signal, which can then be heard by the user as an audible acoustic signal. In this design, the handphone engages in reduced analog and digital signal processing as those aspects are handled on the communication device itself (e.g. a mobile computing device including, but not limited to, a smartphone). As result, this design can provide a strategy to reduce power consumption on the handphone. This design, in turn can also contribute to reducing the physical size of the handphone system. The handphone side of the FM system is shown in FIG. 6b with optional means for analog filtering block before transduction occurs.

This design can improve power consumption of the handphone as: (1) it can be implemented with one or more analog transmission channels, (2) the RF circuitry can optionally be powered down when not in telecommunication mode as shown in FIGS. 5, 6A, and 6B, (3) some of signal processing and filtering is achieved on the telecommunication device rather than the handphone hardware including digital to analog conversion, analog/digital signal processing, and (4) voice input from handphone is transmitted via Bluetooth®.

FIG. 2 illustrates an example of a top-view of a handphone 102 in accordance with an illustrative implementation. The handphone 102 can include a microphone to capture speech/audio from/or near the user. The captured speech/audio can then be transmitted from the handphone device 102 to the telecommunication device 104.

FIG. 3 illustrates a side-view example of the handphone 102 in accordance with an illustrative implementation. The handphone device 102 also includes one or more ultrasound loudspeakers 204a and 204b to output received audio signals from the telecommunication device 104. The position of the microphone is illustrated in FIG. 2 and is only one example of many possible microphone placement possibilities. Microphones used in mobile devices are generally poor in directionality and thus can be positioned behind the layout of the handphone loudspeakers and away from the loudspeakers (2B), which provides an additional way of avoiding sound leakage from the loudspeaker to the microphone.

A carrier frequency 310 is modulated using the modulation signal $x_{mod}[n]$ to create an ultrasound frequency modulated audio signal. The carrier frequency is typically above the audible hearing range and can often be between 40 kHz and 100 kHz. After post-processing the module signal is amplified using an amplification module 312. The resulting modulated ultrasound analog signal 302 can then be sent to a loudspeaker 314 of the handphone device (not shown). Various components of the system 300 can be implemented in hardware and/or software. In another implementation, a second handphone device can receive data from the telecommunication device or other audio device. A user can direct the sound from telecommunication device into each ear to achieve stereo sound.

Figure 7A:
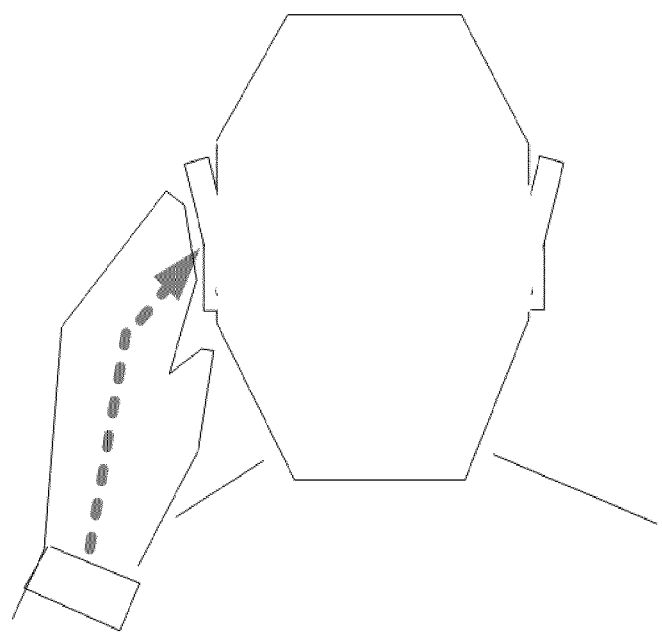
FIG. 7A illustrates redirection of signal from handphone to hand to ear.
Figure 7B:
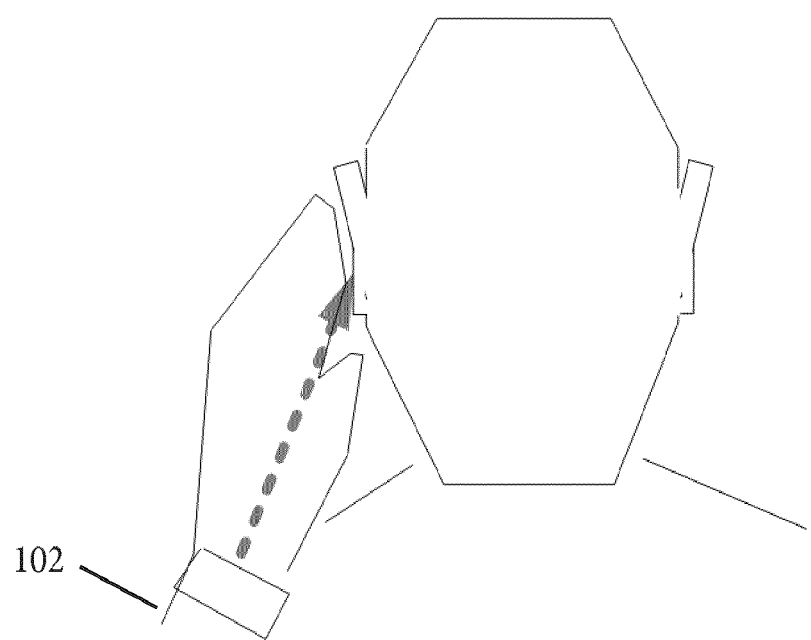
FIG. 7B illustrates direct transmission of signal from handphone to hand to ear.

FIG. 7A illustrates an example use of a handphone in accordance with an illustrative implementation. The handphone device (not shown) can be incorporated into a wrist band, a watch, a bracelet, a ring, eyewear such as prescription glasses, sunglasses, or a standalone device. Ultrasound transducers can output the ultrasound audio signal. The placement of the ultrasound transducers can output the ultrasound audio signal such that the ultrasound audio signal travels along a user's wrist/hand. By bending their fingers, a user can control the direction of the ultrasound audio signal. This allows a user to position their hand and/or fingers, to control the direction of the ultrasound audio signal through sound reflection and redirection. A user can, therefore, direct the audio to their ear or to some other location. The formation of the cup-like shape of the hand and fingers allows for the ultrasound signal to be directed to the ear and will furthermore reduce sound leakage outside the area between the ear and cup-shaped hand. This configuration is shown in FIG. 7A. In another implementation shown in FIG. 7B, the ultrasonic loudspeakers can point directly towards the ear, whereby reflection on the hand/palm can be unnecessary. In this setup the ultrasonic loudspeakers are angled and adjusted for improved sound beam configuration. In this configuration, the hand's positioning and shape can remain the same as before—cup formation with bent fingers which helps in reducing sound leakage. Using the handphone preserves the privacy of the conversation, as the direction ultrasound audio signal is not omni-broadcast from the handphone device. In addition, the telecommunication device does not need to be placed in close proximity to the user's head nor are traditional communication-based wearable accessories needed.

In one implementation, the handphone device 102 emits ultrasound. Ultrasound is generally accepted to be an oscillating sound pressure wave that has a frequency greater than 20,000 Hertz or above the limits of human hearing. In one implementation, the decibel level of the emitted ultrasound is selected based upon the desired volume of the audible sound. Ultrasound is generally considered to be highly directional, particularly with respect to lower frequency sound such as audible sound. In general, the higher frequency, the more directional the sound. However, as frequency increases, so too does the attenuation by material which the sound wave will interact (such as a user's hand). Thus, in one example, the ultrasound is at about 40,000 Hertz. Further, the wavelength to size of the emitting loudspeaker also impacts directionality.

In one implementation, the ultrasound emitted by the handphone device 102 is modulated to carry an audio signal (i.e., in the audible range generally accepted to be 20 to 20,000 hertz). The modulation method may be, but not limited to, amplitude modulation, phase modulation, or frequency modulation. These and other modulation methods may also be combined to yield desirable results. In one implementation, preprocessing and/or post-processing as well as filtering may be utilized to reduce the distortion in the audio signal. Filtering may be analog, digital or both.

Figure 4:
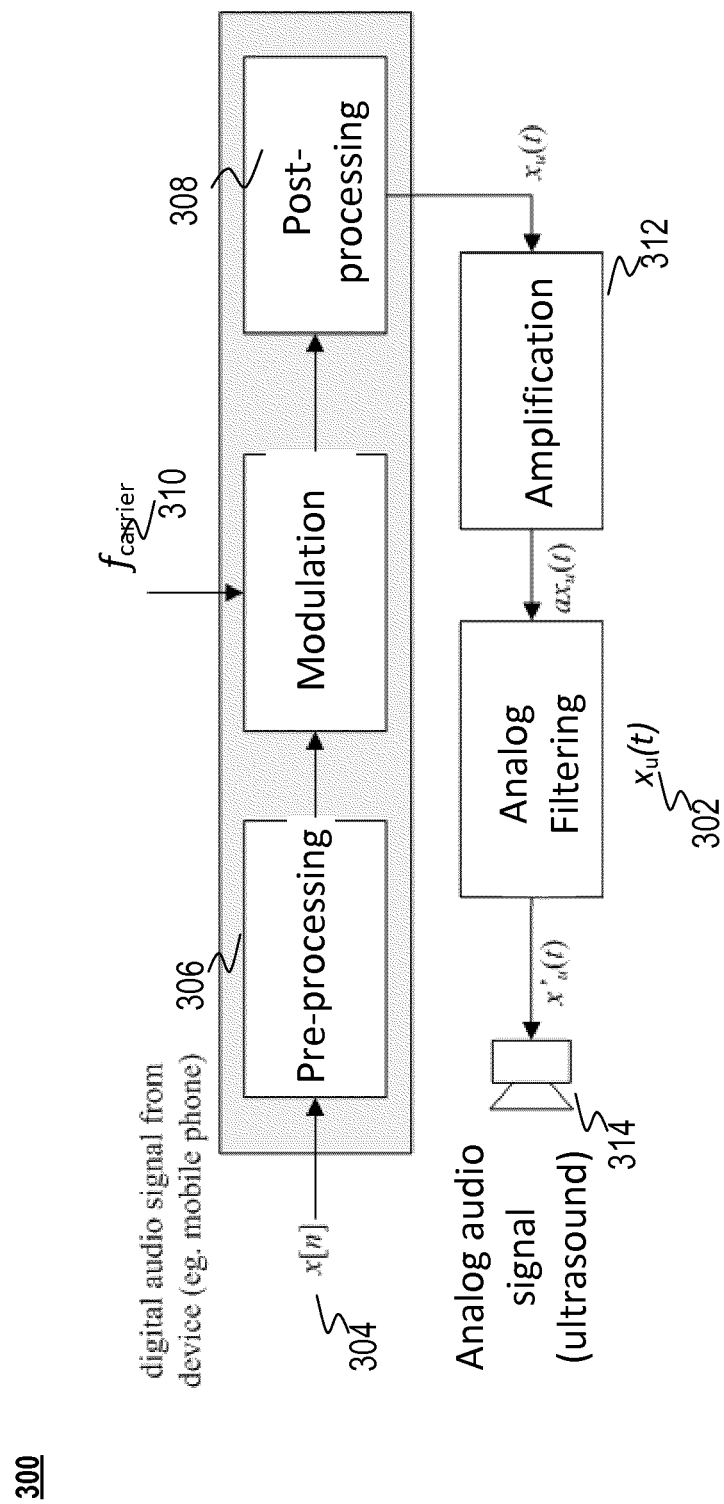
FIG. 4 illustrates a system for modulation of an acoustic signal in ultrasound in accordance with an illustrative implementation.

FIG. 4 illustrates a system 300 for modulation of an acoustic signal in ultrasound in accordance with an illustrative implementation. The system 300 can be integrated into a handphone to generate ultrasound to transmit audio to the user via the handphone device 102. One feature of ultrasound audio is that the audio can be directional. Ultrasound loudspeaker systems allow for fine directionality that can result in a highly focused sound beam. Unlike ultrasound loudspeaker systems, conventional loudspeaker products result in poor directionality of sound projection when configured in standard ways. The system 300 creates an ultrahigh frequency modulated audio signal 302 from a digital audio signal 304. The digital audio signal 304 has a discrete time index n and can be received from the telecommunication device (not shown). The sound quality of the digital audio signal 304 can be improved using a pre-processing component 306 and/or a post-processing component 308. A modulated audio signal that is highly directional is created from the first audio signal of the telecommunication conversation. The modulated audio signal is output via a loudspeaker. A direction of the modulated audio signal is controlled by the positioning of the loudspeaker.

The modulation block can be implemented in various ways including, but not limited to, amplitude modulation (AM), frequency modulation (FM), and phase modulation (PM), where each algorithm will yield subtle differences in sound quality. The phase θ(t) of the transmitted signal is defined as shown below where $A_c$ is the carrier amplitude:

$$y(t) = A_c \cdot \cos(\theta(t)) = A_c \cdot \cos\left(2 \cdot \pi \cdot \int_0^t x(t) \cdot dt\right)$$

For frequency modulation θ(t) becomes:

$x(t)=f_c+A_m \cdot g_{fm}(t)$

For phase modulation θ(t) becomes:

$\theta(t)=2 \cdot \pi \cdot f_c \cdot t+A_m \cdot g_{pm}(t)$ g(t) is the modulator for each algorithm. For amplitude modulation the following relationship between the carrier and modulator components exists:

$y(t)=A_m \cdot g_{AM}(t) \cdot A_c \cdot \cos(\theta_c(t))$

Figure 14:
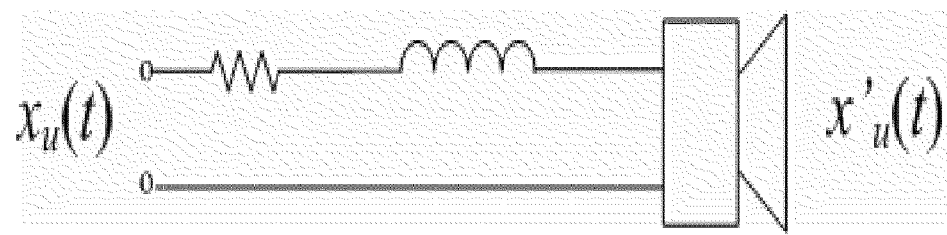
FIG. 14 illustrates an analog filter.

Certain implementations utilize systems and methods for improving sound quality. This includes combinations of various algorithms, weighted, modulated, then summed in various combinations (e.g. FM, AM, PM, and PWM) and finally amplified. Other ways to help improve sound quality may be achieved via digital signal processing including dynamic compression, equalization, and using analog filtering techniques as shown in FIG. 14. When using AM, for example, preprocessing can be used to "neutralize" non-linear distortion artifacts during demodulation of the audible audio wave. This may be accomplished through equalization (integrating twice) before modulation to the ultrasound range as is sometimes used in ultrasound situations.

Figure 13A:
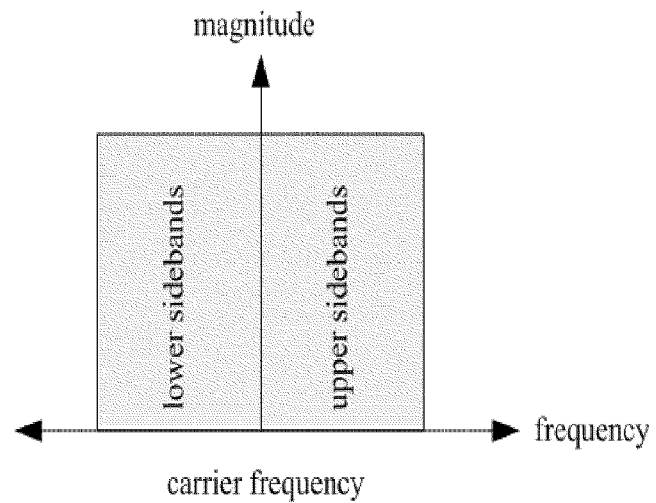
FIG. 13A illustrates a double sideband.
Figure 13B:
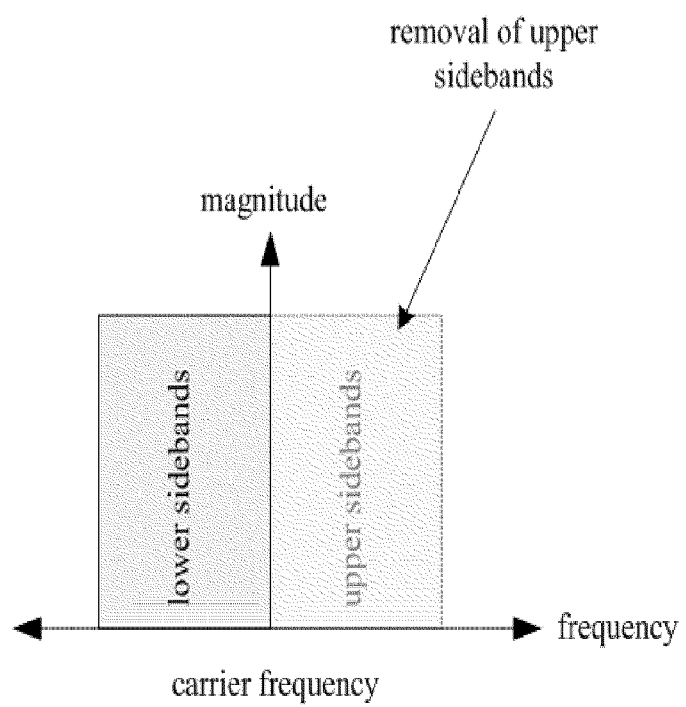
FIG. 13B illustrates a single sideband.

Another modification to the modulation mechanism that can yield change in the sound quality can be achieved with choosing between double sideband (DSB) and single sideband (SSB) modes. This can be achieved, but is not limited to, sharp filtering or Hilbert transforms. The Hilbert transform is a process by which the audio signal's negative frequencies are phase-advanced by 90 degrees and the positive frequency delayed by 90 degrees. The shifted outputs are added to original input audio signal with a net result of no negative frequencies with twice the magnitude due to conservation of energy. As designed for the handphone, SSB modes yielded good audio quality results when using SSB PM techniques which may be added to the post-processing block FIG. 3 The SSB part of the post-processing block and results are shown in FIG. 13a and FIG. 13b, which depict DSB and SSB, after removal of upper sidebands.

The SSB-PM design provides a means to create baseband modulation for the spectrum that is below the center frequency of the carrier frequency which additionally helps with reducing transmitted power as only one side of the sidebands are generated (ideally 50% reduction of transmitter power). This can also be applied to FM where only the lower sidebands are used.

Figure 15:
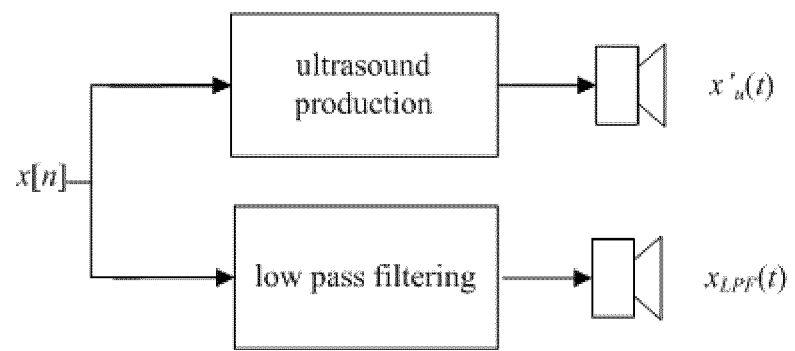
FIG. 15 illustrates a low-pass filtered sound and ultrasound.

Analog filtering may also be applied after ultrasound modulation. The analog filter as shown in FIG. 14 can be used to increase the narrow bandwidth of narrowband ultrasonic transducers such as piezoceramic transducers. Example filters may include passive inductor-resistor (L-R) circuits for bandwidth increase of ultrasonic transmitters as shown in figure below:

Utilizes ultrasonic transducers in combination with traditional loudspeaker configurations. The handphone setup may, in this configuration, use two audio channels for producing sound—one in the ultrasound range and one in the lower portion of human hearing range. The low-frequency sound channel will reproduce only low frequency portion of the acoustic signal which is for all practical purposes unintelligible but improves the overall sound heard by the user as the ultrasound provides the speech signal and information and the low channel audio signal provides low frequency bass, which creates a more natural, fuller, and warmer sound experience. This is shown in FIG. 15.

The combined low-pass filtered sound and ultrasound will produce a fuller and more natural sound for the user. This configuration exploits the characteristics of low frequency sound which includes (1) unintelligibility and (2) omni-directionality. Omni-directionality ensures that the sound will reach the users ear and unintelligibility ensures privacy while the combined ultrasound and low frequency audio signal will create a naturally sounding resulting signal.

Methods for improving resulting audible sound include, but are not limited to, using pre and post-filtering and equalization.

Ultrasonic transducers are narrowband which can result in the reduced low frequency sound when demodulated. In order to improve low-frequency reproduction, the handphone system, in one implementation, In one implementation, the ultrasound transducers are nonparallel to provide for more than one directional sound beam. Two users may utilize the handphone 102 by use of the separate beams.

In one implementation, the handphone device 102 is limited to a maximum decibel level of ultrasound.

Figure 8A:
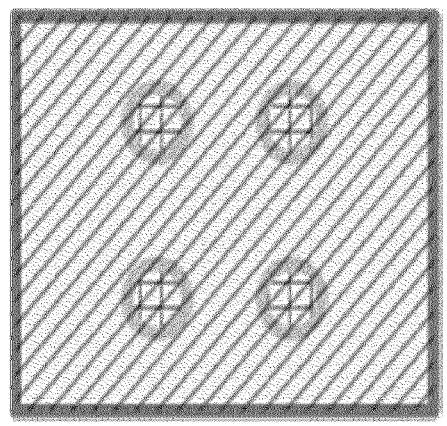
FIG. 8A is a top view of enclosure and FIG. 8B is a side view of enclosure closed.

In one implementation shown in FIG. 7A the beam is reflected off of the hand. In another implementations, the loudspeakers include a deflector which directs the beam generally perpendicular to a user's arm. In this implementation, the user need not use their hand rather the beam is directed to the ear by the deflector. In another implementation shown in FIG. 8C, the handphone ultrasound loudspeaker configuration is setup such that the loudspeakers point perpendicular to the surface like the wrist as shown in FIGS. 8A, 8B, and 8C FIG. 8A shows the top view of the handphone enclosure where the transducers are pointing towards the viewpoint at an angled setup.

Figure 8B:
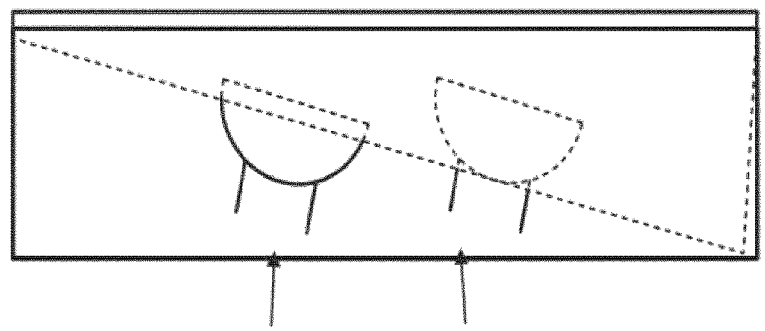

FIG. 8B shows a side view example with the top lid closed when not in call mode.

Figure 8C:
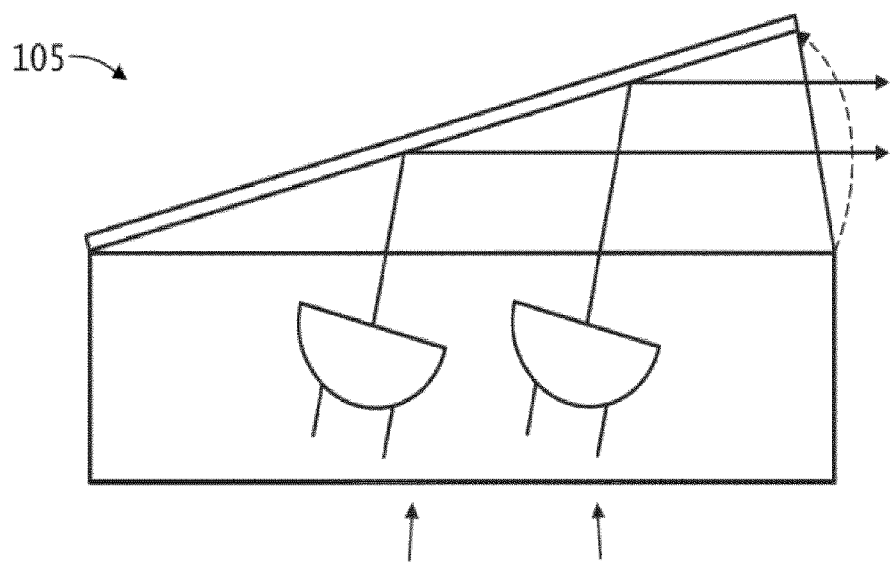
FIG. 8C is side view of enclosure open.

FIG. 8C shows a side view example where the top lid is opened and the ultrasound is reflected by the lid's surface and redirected to the palm or directly to the user's ear. In this configuration a larger number of ultrasonic loudspeaker may be set up.

In another implementation, the handphone can have a display to indicate incoming messages including, but not limited to, incoming calls. A button can be attached to the handphone to receive this call. Another button, or the same button, can be used to terminate such a call. Such control messages may be implemented with among other technologies, Bluetooth Human Interface Device Profile (HID).

In one implementation, the handphone device 102 includes one or more motion sensing mechanism, such as an accelerometer and/or a gyroscope. The motion sensing mechanism can be utilized with a logic system to identify certain movements of the handphone device 102 and perform a response. For example, raising the user's hand where a handphone device 102 is strapped to their wrist, similar to how one would move to raise a phone to one's ear, may be utilized to indicate the hand phone device 102 should activate a call.

For example, in one implementation, the handphone can have one or multiple accelerometers attached to it. The accelerometers can be used to measure multidimensional acceleration, and by extension, movement of the arm or other parts of the body where the handphone may be attached. A message sent over communication methods such as Bluetooth® can transmit incoming call information to the handphone. This incoming call can be represented as a flag, where one symbol or value (e.g. 0) can represent no incoming call, and another symbol or value (e.g. 1) can represent request for communication from an incoming call. In this implementation considering the state of the incoming call flag (e.g. 1) and the particular movement measured by the accelerometer, a decision can be made to accept of incoming call by the handphone. For example, an incoming call will set flag (e.g. 1) and raising of hand will measure a result in a very reading of the y axis accelerometer whereas all other axis will have very low readings: x=0.0; y=9.0; z=0.0 on the Samsung Galaxy III smartphone. Considering the combination of x, y, and z readings with respect to time (delta time) in conjunction with the incoming call flag (e.g. 1), buttonless call-receive can be achieved. In this design, no user interface objects, including, but not limited to, buttons are needed. The software may also be implemented using machine learning and gesture classification using sensor readings.

Figure 9A:
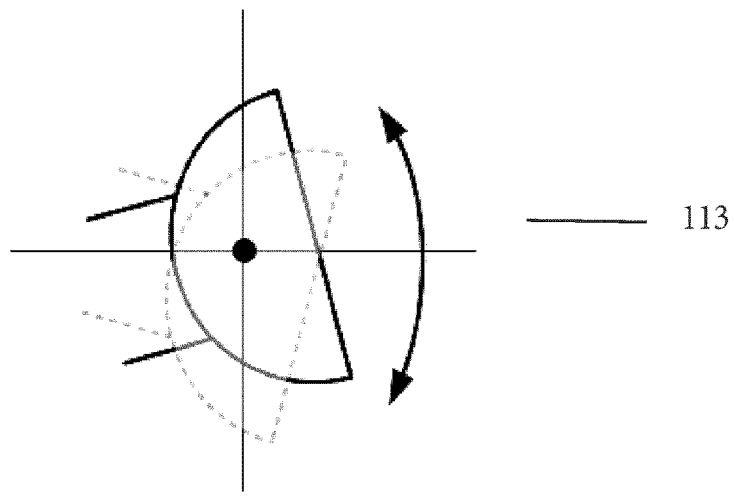
FIG. 9A illustrates Horizontal loudspeaker adjustment.
Figure 9B:
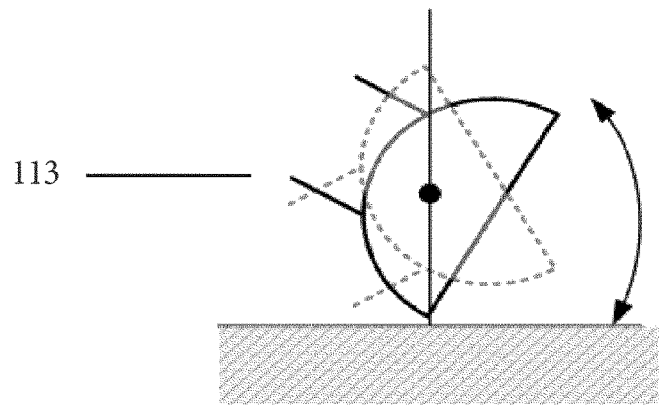
FIG. 9B illustrates vertical loudspeaker adjustment.
Figure 9C:
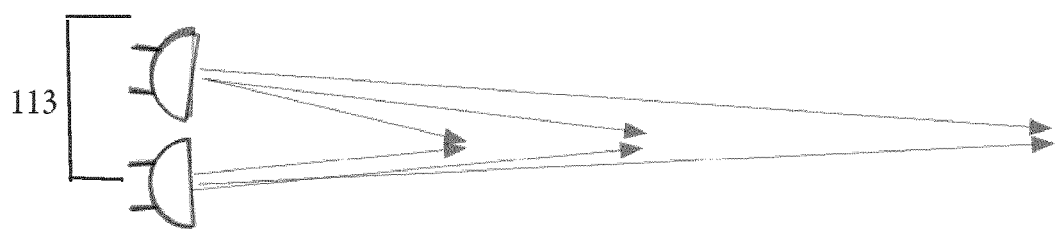
FIG. 9C illustrates the resulting change in distance and focus in horizontal adjustment.

In another implementation the configuration of the handphone loudspeakers may be modifiable to allow customization of directivity and focus of sound beam focus as shown in FIGS. 9A, 9B, and 9C.

In one implementation, the handphone device 102 includes a receiver for receiving a sound beam. The receiver of one hand phone device 102 is configured to receive and process the sound beam from another handphone device 102.

Figure 10:
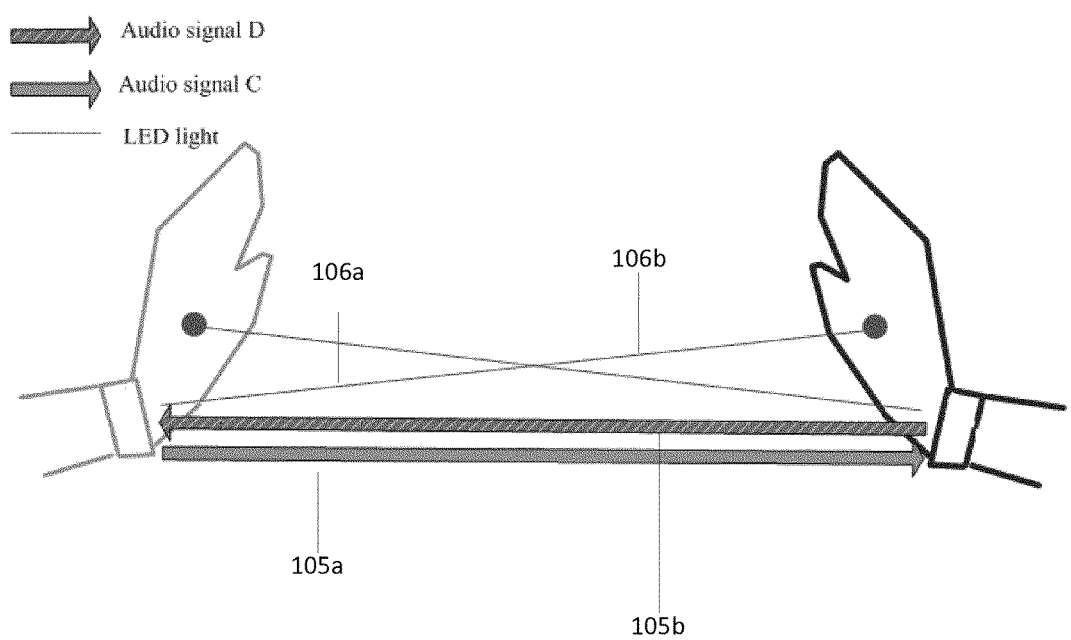
FIG. 10 illustrates two handphones configurations with transmitter transducer, receiver transducer, and pointing LED design.

In another implementation a device 102 may have one or more sound transmitters and receivers attached to it. The transmitter can be an ultrasound transducer in ultrasound audio communication configurations, or conventional loudspeaker for beamforming communication configurations. The receiver device will be ultrasound receivers for ultrasound configurations, and microphone for beamforming configurations. In one scenario there may be two handphones 102a, 102b are utilized, handphone A 102a and handphone B 102b. Handphone A 102a may transmit and receive signals sent to and from handphone B. This setup may allow a remote person C speaking to the person holding handphone A 102a to speak to a remote person connected to handphone 102b by transmitting the acoustic signal 105a from the handphone A 102a to handphone B 102b and vice versa with the acoustic signal 105b from handphone B 102b. In one implementation, a light source such as a LED or laser is provided to indicate the path and target destination of the sound beam. The light source may be helpful in aligning one handphone device 102 with another handphone device 102 to transfer information or sound via the sound beam. The light source 106 may be added to each of the handphone 102 to aid in guiding the communication signal from handphone A 102a to handphone B 102b or vice versa as shown in FIG. 10, such as through the use of device laser 106a and device laser 106b, respectively. This type of multi-handphone communication may involve two, three, or more participants.

Figure 11:
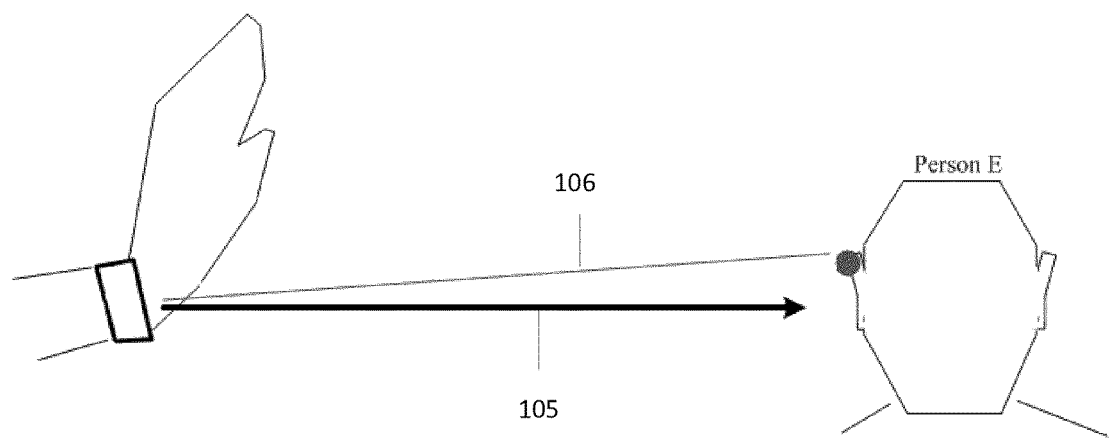
FIG. 11 illustrates one handphone transmitting signal from handphone A to person E with optional LED guide

This design can also be used in transmitting audio signal from handphone A to a person E sitting across the room who does not have a handphone device as shown in FIG. 11.

Figure 12:
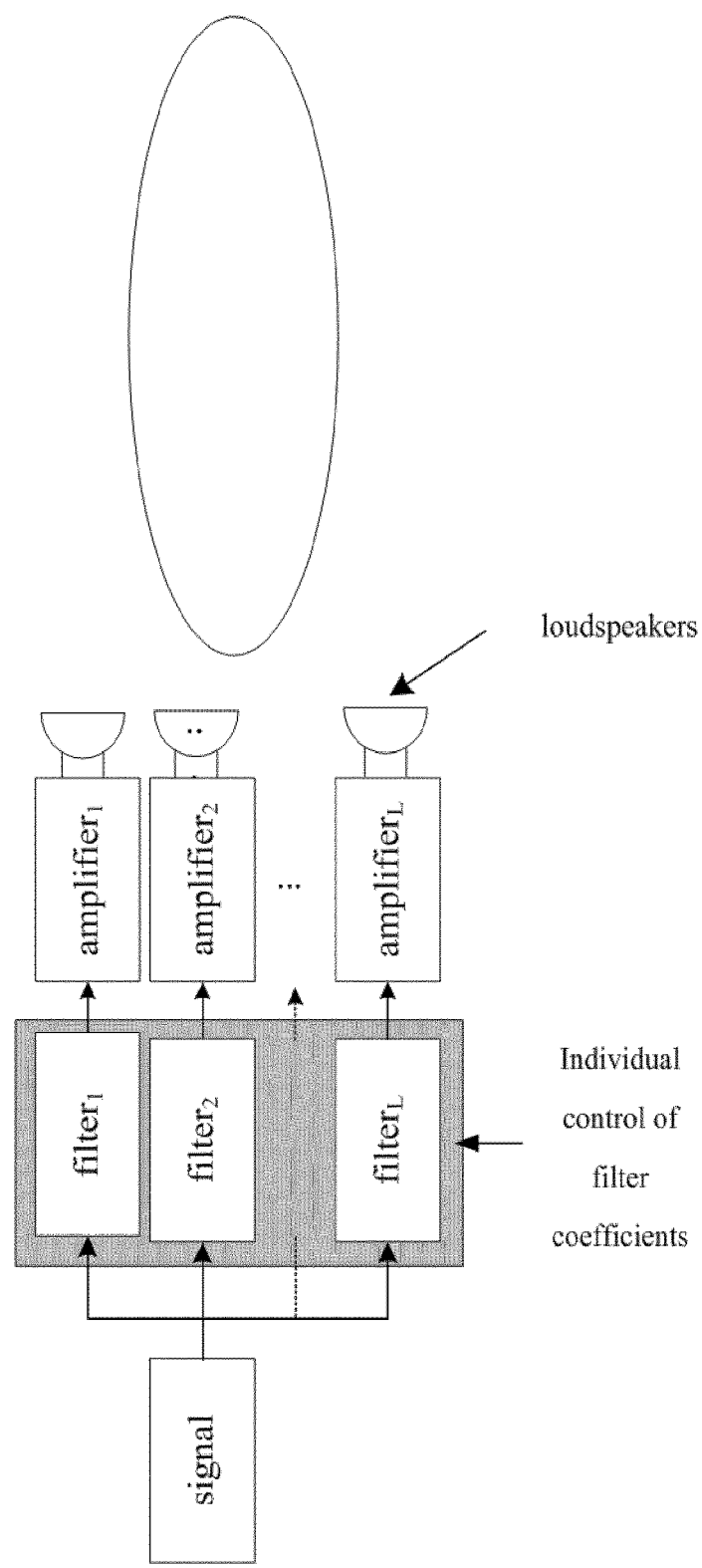
FIG. 12 illustrates an acoustic beamforming setup.

In another implementation, the handphone ultrasound loudspeaker may be replaced by conventional audible range loudspeakers. In this implementation the acoustic beamforming is created by a loudspeaker array with two or more loudspeakers with corresponding individual amplification and filtering options. Filter coefficients can be adjusted for improved beamforming of signal transmitted from the handphone to the user desired point of destination including, but not limited to, the user's ear. Highly directional acoustic signals can also be rendered through acoustic beamforming techniques where the input audio signal can be filtered and then amplified and sent to loudspeakers as shown in FIG. 12. In this implementation, a carrier modulated by the modulating signal configuration, as used in ultrasound systems, may not be necessary as the filter coefficients can be used to control directivity of resulting sound-beam. The signal for transmission is sent to a unique filter-amplifier-loudspeaker configuration, which can be implemented in a number of configurations, including, but not limited to, 2, 3, and/or more. When using 2 filter-amplifier-loudspeaker configurations, the net result can be 2 loudspeakers, 2 amplifiers, and two filters.

Another implementation of transducer technologies for ultrasound generation is through graphene-based materials. Graphene is generally very efficient in terms of power consumption, very strong physically, and very flexible. Graphene based loudspeaker designs can be utilized with a handphone using a number of methods including but not limited to a thermoacoustic approach and an electro-static approach. As graphene are extremely efficient, flexible, and consume very little energy, the use of graphene for ultrasound generation may be utilized.

In the thermoacoustic design, sound is generated through changes in temperature at a very quick rate (audio rate). Thermoacoustic graphene loudspeaker systems are especially flat in frequency response in the ultrasonic frequency range. Designs for a thermoacoustic ultrasonic loudspeaker include the substrate upon which the graphene film rests on, electrodes that provide the ultrasound signal, and the graphene layer itself. One design that can improve efficiency is to add a heat sink to the substrate to allow for a larger temperature swing, which in turn translates to larger acoustic energy output.

In the electrostatic approach, two electrodes sandwich a thin layer graphene film. The electrodes have opposite polarity and the graphene film has a constant DC voltage bias. The attractive and repelling interaction caused by the electrodes onto the graphene film is the basis of this technology. A modification of this design is to only use one electrode on one side of the graphene film to drive the graphene film. Although there will be some distortion associated with this design, sound will be more effectively transmitted as the electrode plates (which are porous) will only exist on one side. The open side will allow sound to travel freely without any obstacles.

Figure 16A:
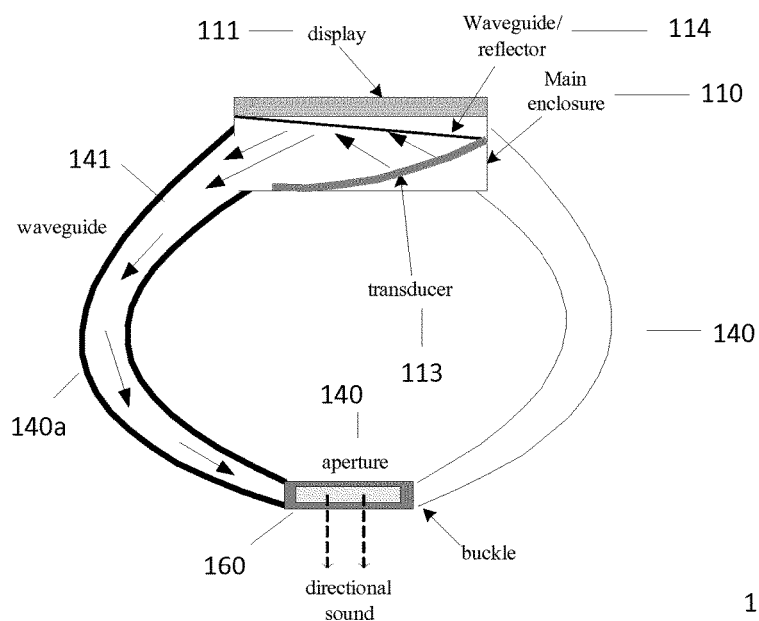
FIG. 16A-16B illustrate implementations having a wave guide band for emitting directional sound from the buckle area of a wrist mounted device.

In one implementation, the ultrasound may be transmitted through the band of a watch 102. FIG. 16A shows an acoustic waveguide system to direct acoustic energy from acoustic transducers 113 installed as part of a main enclosure 110 such as a wristwatch instead of installing transducers in the lower part of the wristband 140 as shown in FIGS. 8A-C. The use of a waveguide system 141 in the band 140 allows for transducer 113 size increase, which in turn allows for greater directionality and improved sound quality. Additionally, this system also reduces the size of the wristband/strap 140—especially in the buckle part 160—as the transducer(s) 113 no longer needs to be installed in wristband/strap area (palm side opposite the display 111). The acoustic energy 105 from the transducer 113 is guided via a waveguide system 141 whereby acoustic signal travels from the main part 110 of the wearable device (e.g. watch) 102, through the hollow wristband 140a, and is finally outputted via one or more apertures 161 at the bottom of the wristband/strap 160. In one implementation, the hollow wristband 140a is made of an acoustically reflective material to minimize loss of acoustic energy. In a further implementation, an inner surface of the hollow wristband 140a includes a material, for example as a coating, and is shaped to reduce acoustic energy loss. The transducer 113 positioned in the main enclosure is in one implementation positioned to direct acoustic energy directly into the waveguide 141 of the hollow band 140a. In an alternative implementation, the transducer 113 is in communication with a reflector 114 positioned to reflect acoustic energy from the transducer 113 to the waveguide 141.

In this system, no electronics are necessary in the strap 140 itself, allowing simple replacement of broken straps or other strap designs. In one implementation, the strap 140 comprises a first strap 140a and a second strap 140b. Only one strap, e.g., strap 140a, may include the waveguide and direct the acoustic signal in one implementation. Additionally, sound can travel in both of the hollow bands 140a, 140b. In one implementation, signal processing is applied to neutralize filter effects caused by the hollow wristband 140a acting as a waveguide. A microphone (not shown) can be placed in the area of the sound aperture or the strap 10 itself to capture user's speech. In another system, the transducer 113 can be placed towards the top, side, or any other configuration in the main enclosure 110 of the device so as to provide optimal sound output, waveguide configurations, while considering custom circuitry and hardware setups needed for the wearable device.

Figure 16B:
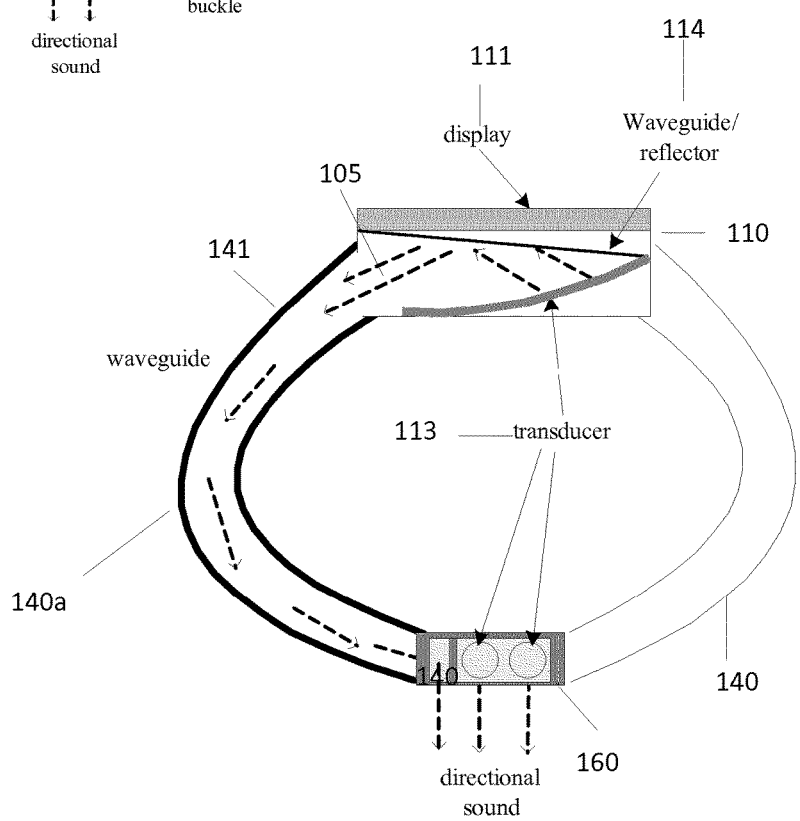

The system can be implemented with one or more transducers 113 placed in the main enclosure 110. Transducers 113 also need not be of same size and performance specifications. Additionally, the transducers 163 can also be simultaneously be installed in the buckle 160 of the device 102 as well as the main enclosure 110 of the wearable device 102 (e.g., transducers 113) in order to produce increased acoustic energy as shown in FIG. 16B. The advantage of using more transducers is the increase in overall intensity levels, and generally speaking, better sound quality.

In one implementation, the main enclosure 110 and band 141 comprise a ring. The display 111 may comprise a projector. For example, in one implementation, the display 111 may comprise a holographic projector, where the projected image appears above the main enclosure 110, allowing for the projected display to be visually larger than the main enclosure 110.

In one implementation, the device 110 is utilized with a bone anchored hearing system. For example, a bone anchored hearing system may be inserted behind the ear in contact with the bone. The bone anchored hearing system is configured to receive a signal, such as ultrasonic acoustic energy, from the device.

In one implementation, the device 110 is headgear such as glasses. An ultrasonic loudspeaker is positioned in the glasses frame with the directional sound directed to one or both of the wearer's ear's.

In one implementation, an ultrasonic loudspeaker is provided for use in transmitting sound from a computer, including a personal computer, a laptop, or a tablet. In a further implementation, an ultrasonic loudspeaker is provided for use with a display, such as for a loudspeaker for a television or computer monitor, including as a freestanding loudspeaker, clipped on loudspeaker, or soundbar. It will be appreciated that such applications allow for directional sound in comparison to standard audio loudspeakers.

Figure 17A:
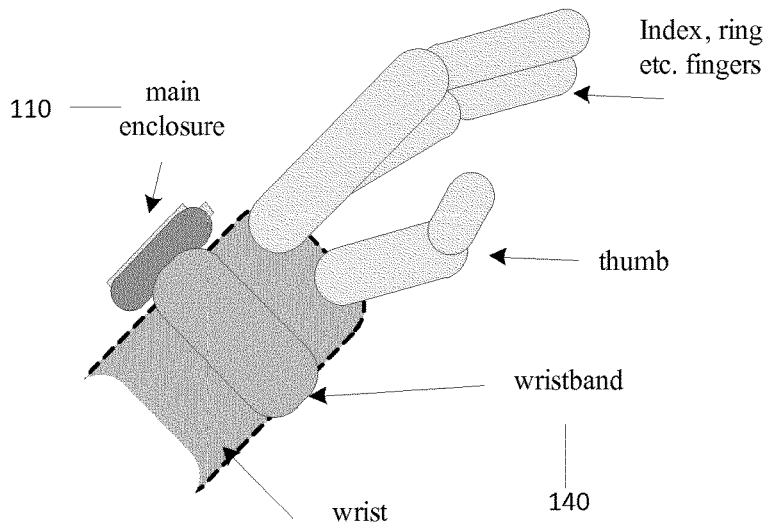
FIG. 17A illustrates a wrist mounted device in a typical position.
Figure 17B:
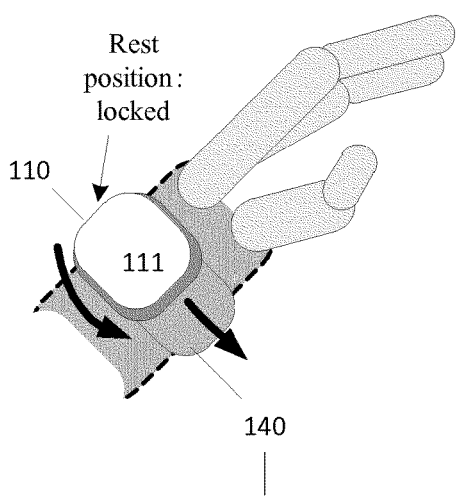
FIGS. 17B-D illustrate implementations having a main enclosure that is slidable in position relative to the bands (and the hand/wrist).
Figure 17C:
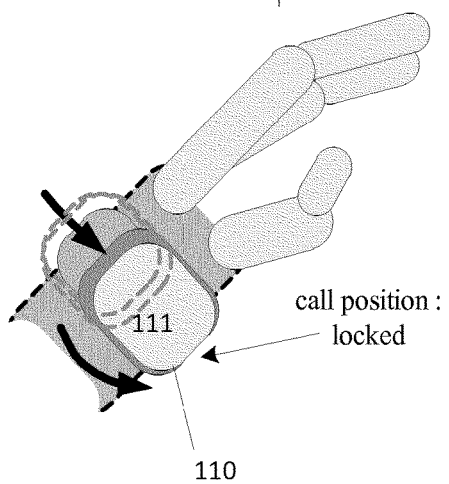
Figure 17D:
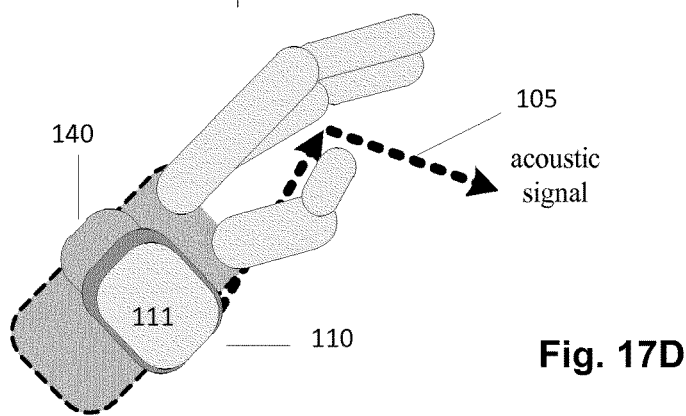

In one implementation, the device may include an ultrasonic loudspeaker that projects directly from the main enclosure 110. Traditionally, as shown in FIG. 17A, wearable technology, such as watches, are worn with the main body and display, such as a watch face, positioned on the wrist in line with the fingers, essentially parallel with and opposite the palm. However, this positioning requires a user to rotate the wrist to place the main body in line of sight for the eyes. However, in an alternative implementation, as shown in FIG. 17B, the main enclosure 110 (and display 111) is positioned behind the thumb, essentially perpendicular to the palm rather than parallel. It should be appreciated that the main body 110 and/or the display 111 can be curved to provide a comfortable fit given the shape of the human wrist. If the display is on the opposite side of the palm, as is traditional, the user has to turn his/her wrist in order to see the information on the device. The system shown in FIGS. 17B-D shows a strategically placed main enclosure 110 that can also be moveable. The main enclosure 110 can be positioned behind the thumb as shown in FIG. 17D. FIG. 17B shows an example of where the rest position is approximately behind the thumb opposed to the opposite side of the palm, which is the traditional form factor for watches. In one implementation, the device 102 utilizes a flexible display 11. This system has a number of advantages over traditional "watch" form factors: (1) users can immediately view information without twisting one's arm (a more ergonomically natural gesture), (2) more area of the wristband section can be used to house circuitry and hardware, including transducers and display real-estate.

FIG. 17B shows a system where the main enclosure can be moved from "rest position" (e.g., FIG. 17A or any other rest position) to a locked "call position" as show in FIG. 17B. In one implementation, best shown in FIG. 17D, the call position places the ultrasonic loudspeaker (associated with the main body 110, which slid or repositioned on the band 140) in position for directing sound to the wearer's ear via the hand when the hand is positioned adjacent the head (such as either shown in FIG. 7A or FIG. 7B). The call position, in one implementation, places the main body 110 underneath the thumb. The main body 110 in the call position may be placed on the palm side of the wrist, essentially opposite of the normal position for a watch.

The release-lock mechanism 180 allows the main enclosure 110 to slide from rest (FIG. 17B) to call position (FIG. 17C) by a simple mechanical release system using the other hand's thumb, for example. This system can be especially effective for the handphone technology as a larger main enclosure 110 footprint can provide additional space for electronics making it possible to have more space for circuitry, larger/more batteries, larger displays, and larger/more transducers and/or more transducer arrays, which in turn will result in more acoustic energy output. When in the call position, the transducer's 113 output signal (whether via waveguide configurations (FIG. 16A-B) or by placing the transducers 163 near the bottom of the main enclosure (FIGS. 8A-C)), will effectively and efficiently be transmitted to users ear due to the short distance and larger or more transducer arrays—this is shown in FIG. 17D.

When a call ends, the user can snap back the main enclosure to its rest position thereby concluding the call. FIG. 17A is the traditional watch design which includes smartwatches with the main watch body on the top part of one's forearm. FIG. 17B to FIG. 17C illustrate a device in accordance with an implementation of the invention. When in rest position the display 111 is curved so that it the main display area can be viewed without twisting/rotating the wearer's arm. That is, a person's natural position of forearm is with palms towards one's body or thigh when standing. In addition to the mechanical interaction of the main enclosure 110 and the band 140, the device may receive a signal upon sliding the main body 110. For example, when taking a call, sliding the device main body 110 down towards the buckle 160 can create signal instructing the device to start a call, or alternatively taking a call can be initiated with gestures or pressing a button. In one implementation, the main body is near the buckle part of the watch after sliding is complete—at this point, the main watch part locks. When user wants to end the call, the user slides it back to its rest position as in FIG. 17B. Alternatively the watch can be slid back to its rest position and the call can be ended with a gesture or button captured by accelerometer sensors.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A wearable communication device comprising:
    a receiver, wherein the receiver receives audio information;
    a pre-processing module connected with the receiver, wherein the pre-processing module modifies the received audio information;
    a modulation module connected with the pre-processing module, wherein the modulation module modulates the modified audio information;
    an amplification module connected with the modulation module, wherein the amplification module amplifies the modulated audio information;
    a channel splitter connected with the amplification module, wherein the channel splitter splits the amplified audio information into a first channel and a second channel;
    an ultrasonic loudspeaker connected with the channel splitter, wherein the ultrasonic loudspeaker receives and emits the amplified audio information from the first channel; and
    a low frequency loudspeaker connected with the channel splitter, wherein the ultrasonic loudspeaker receives and emits the amplified audio information from the second channel.

2. The device of claim 1 further comprising a main enclosure having disposed therein the receiver and the pre-processing module and further comprising a transducer disposed within the main enclosure.

3. The device of claim 2, further comprising a waveguide connected to the main enclosure, wherein the waveguide transmits the amplified audio information to the ultrasonic loudspeaker, and wherein the ultrasonic loudspeaker is positioned external from the main enclosure.

4. The device of claim 3, further comprising a band including the waveguide.

5. The device of claim 4, further comprising a reflector, wherein the reflector reflects energy from the transducer into the waveguide.

6. The device of claim 5, further comprising a second transducer positioned between the ultrasonic loudspeaker and the waveguide.

7. The device of claim 1 further comprising a channel splitter and a low frequency loudspeaker, wherein the channel splitter splits the amplified audio information into a first channel and a second channel, the first channel in communication with the ultrasonic loudspeaker and the second channel in communication with the low frequency loudspeaker.

8. The device of claim 1, further comprising a motion sensor.

9. The device of claim 1, further comprising a light source providing a directional beam, the directional beam corresponding with a path of amplified audio information emitted by the ultrasonic loudspeaker.

10. The device of claim 1, wherein the ultrasonic loudspeaker comprises one of electro static graphene loudspeaker or a thermos acoustic graphene loudspeaker.

11. The device of claim 1, further comprising:
    a band and a main enclosure;
    the main enclosure slidable along the band from a rest position to a call position.

12. The device of claim 11, wherein the band has a curved structure and the main enclosure has a curved structure configured to slide along the curved structure of the band.

13. The device of claim 12, further comprising call position switch and a rest position switch associated with the band and engagable by the main enclosure when in the call position and rest position, respectively.

14. A device comprising:
    a receiver, wherein the receiver receives audio information;
    a pre-processing module connected with the receiver, wherein the pre-processing module modifies the received audio information;
    a modulation module connected with the pre-processing module, wherein the modulation module modulates the modified audio information;
    an amplification module connected with the modulation module, wherein the amplification module amplifies the modulated audio information;
    an ultrasonic loudspeaker connected with the amplification module, wherein the ultrasonic loudspeaker receives and emits the amplified audio information;
    a band; and
    a main enclosure, the main enclosure slidable along the band from a rest position to a call position.

15. The device of claim 14 further comprising the main enclosure having disposed therein the receiver and the pre-processing module and further comprising a transducer disposed within the main enclosure.

16. The device of claim 15, further comprising a waveguide connected to the main enclosure, wherein the waveguide transmits the amplified audio information to the ultrasonic loudspeaker, and wherein the ultrasonic loudspeaker is positioned external from the main enclosure.

17. The device of claim 16, wherein the band includes the waveguide.

18. The device of claim 16, further comprising a reflector, wherein the reflector reflects energy from the transducer into the waveguide.

19. The device of claim 18, further comprising a second transducer positioned between the ultrasonic loudspeaker and the waveguide.

20. The device of claim 14 further comprising a channel splitter and a low frequency loudspeaker, wherein the channel splitter splits the amplified audio information into a first channel and a second channel, the first channel in communication with the ultrasonic loudspeaker and the second channel in communication with the low frequency loudspeaker.

21. The device of claim 14, further comprising a motion sensor.

22. The device of claim 14, further comprising a light source providing a directional beam, the directional beam corresponding with a path of amplified audio information emitted by the ultrasonic loudspeaker.

23. The device of claim 14, wherein the ultrasonic loudspeaker comprises one of electro static graphene loudspeaker or a thermos acoustic graphene loudspeaker.

24. The device of claim 14, wherein the band has a curved structure and the main enclosure has a curved structure configured to slide along the curved structure of the band.

25. The device of claim 14, further comprising a call position switch and a rest position switch associated with the band and engagable by the main enclosure when in the call position and rest position, respectively.

* * * * *